FIP8102 XR 3,171,897 CROSS REFERENCE [redacted]

230

(1)

March 2, 1965 S. WLASUK 3,171,897

FM STEREO MULTIPLEX TEST INSTRUMENT

Filed Nov. 29, 1962

3 Sheets-Sheet 1

INVENTOR.
STEVEN WLASUK
BY
Eugene M. Whitacre
ATTORNEY

March 2, 1965 S. WLASUK 3,171,897

FM STEREO MULTIPLEX TEST INSTRUMENT

Filed Nov. 29, 1962 3 Sheets-Sheet 2

INVENTOR.
STEVEN WALSUK

BY Eugene M. Whitacre

ATTORNEY

INVENTOR.
STEVEN WLASUK
BY
[signature]
ATTORNEY

United States Patent Office 3,171,897
Patented Mar. 2, 1965

3,171,897

FM STEREO MULTIPLEX TEST INSTRUMENT

Steven Wlasuk, Blackwood, N.J., assignor to Radio Corporation of America, a corporation of Delaware Filed Nov. 29, 1962, Ser. No. 240,978
7 Claims. (Cl. 179—15)

Figure 1:
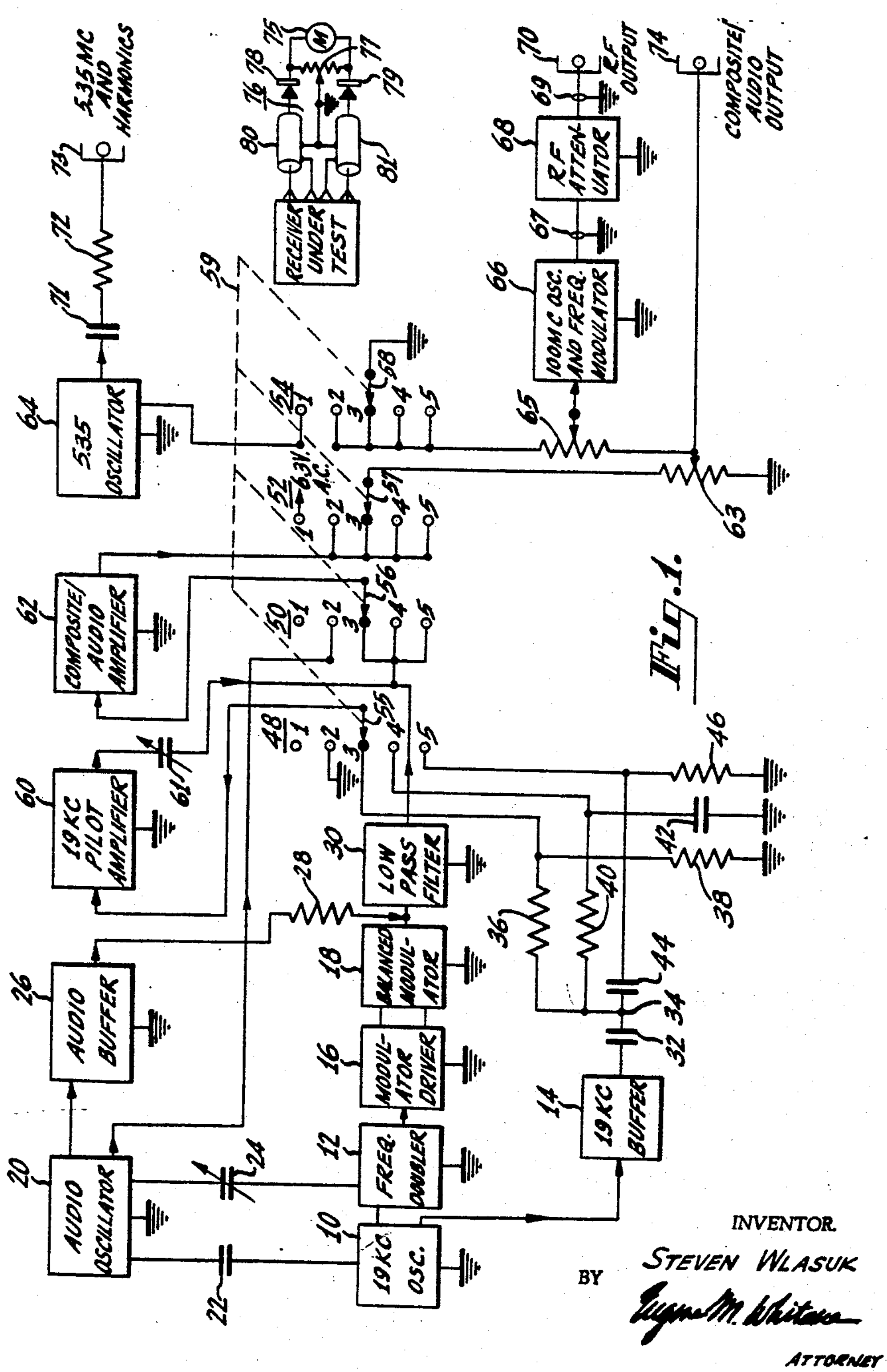

This invention relates generally to electrical signal generators, and more particularly to apparatus for generating waves which are useful for testing the circuits of stereophonic frequency modulation (FM) receivers.

In accordance with present standards for the transmission of stereophonic signals in the FM broadcast band, a pair of left and right stereophonic signals, L and R, are combined in a manner to provide sum $(L+R)$ and difference $(L-R)$ signals. The difference signal is used to modulate a 38 kilocycle (kc.) subcarrier wave in a manner to provide a double-sideband amplitude-modulated supressed subcarrier signal. A 19 kc. pilot signal, which is phase related to the subcarrier wave, is added to the subcarrier sidebands and the $L+R$ signal to form a composite signal. The composite signal is used to frequency modulate the main carrier wave to be transmitted.

The transmitted stereophonic FM wave may be compatibly received by monophonic FM receivers to monophonically reproduce the main channel $L+R$ signal. Although the entire composite stereophonic signal is developed in the output circuit of the FM detector of a monophonic receiver, the superaudible pilot signal and subcarrier sidebands are attenuated by the deemphasis circuits of the receiver. Stereophonic FM receivers differ from monophonic FM receivers in that multiplex demodulating circuitry is coupled to the FM detector to derive the separate left and right stereophonic signals from the composite signal.

Testing apparatus required for the servicing and adjustment of monophonic FM receivers is also required for stereophonic FM receivers. In addition, FM stereophonic receivers require equipment for generating a stereophonic FM test signal so that the multiplex demodulating circuitry may be adjusted to effect maximum separation between the resultant left and right output signals. Heretofore apparatus for developing the stereophonic FM test signal has been designed along the lines of apparatus used at the transmitter for generating the composite signal. As a result, such testing apparatus has been relatively complicated and expensive.

It is an object of this invention to provide an improved apparatus for generating stereophonic FM test signals.

Another object of this invention is to provide an improved signal generator of stereophonic FM test signals, which is versatile and reliable in operation and which is uncomplicated in design and inexpensive in cost as compared to known stereophonic FM test signal generators.

In accordance with an embodiment of the invention, a common audio signal is used to represent both the $L+R$ and the $L—R$ signals. The audio signal and a subcarrier wave at 38 kc. are applied to a modulator to provide an output signal including a double-sideband amplitude-modulated suppressed subcarrier signal and the audio signal. A 19 kc. pilot which is phase related in a predetermined manner to the subcarrier wave is combined with the output signal from the modulator to provide a composite test signal. The composite signal may be used directly for test purposes, but preferably the composite signal is used to frequency modulate a carrier wave having a frequency in the FM broadcast range so that the modulated carrier wave may be applied to the input circuit of a receiver to be tested.

The multiplex demodulating circuitry of a stereophonic receiver can be tested by varying the phase of the pilot signal portion of the composite signal. When the phase of the test pilot signal with respect to the phase of the test suppressed subcarrier bears the same phase relation as the pilot and subcarrier wave of a transmitted signal, the test signal should produce a signal output from only one channel of a receiver under test. It should be noted that when $(L+R)=(L-R)$, as in the case of the test signal, $R=0$. Likewise if the test pilot signal is shifted in phase sufficiently that the resultant demodulating signal derived therefrom in the receiver under test is shifted in phase 180°, then there should be a signal output from only the other channel of the receiver. In the latter case the relationship of the audio signals is $$(L+R)=-(L-R)$$

If the phase of the test pilot signal is adjusted to a value midway between the aforementioned phase values, the output from the two receiver channels should be equal. By adjusting the multiplex demodulating circuitry of a receiver to which the test signals are applied, an optimum adjustment of the circuitry may be made for maximum separation of the left and right stereophonic signals.

Figure 2A:
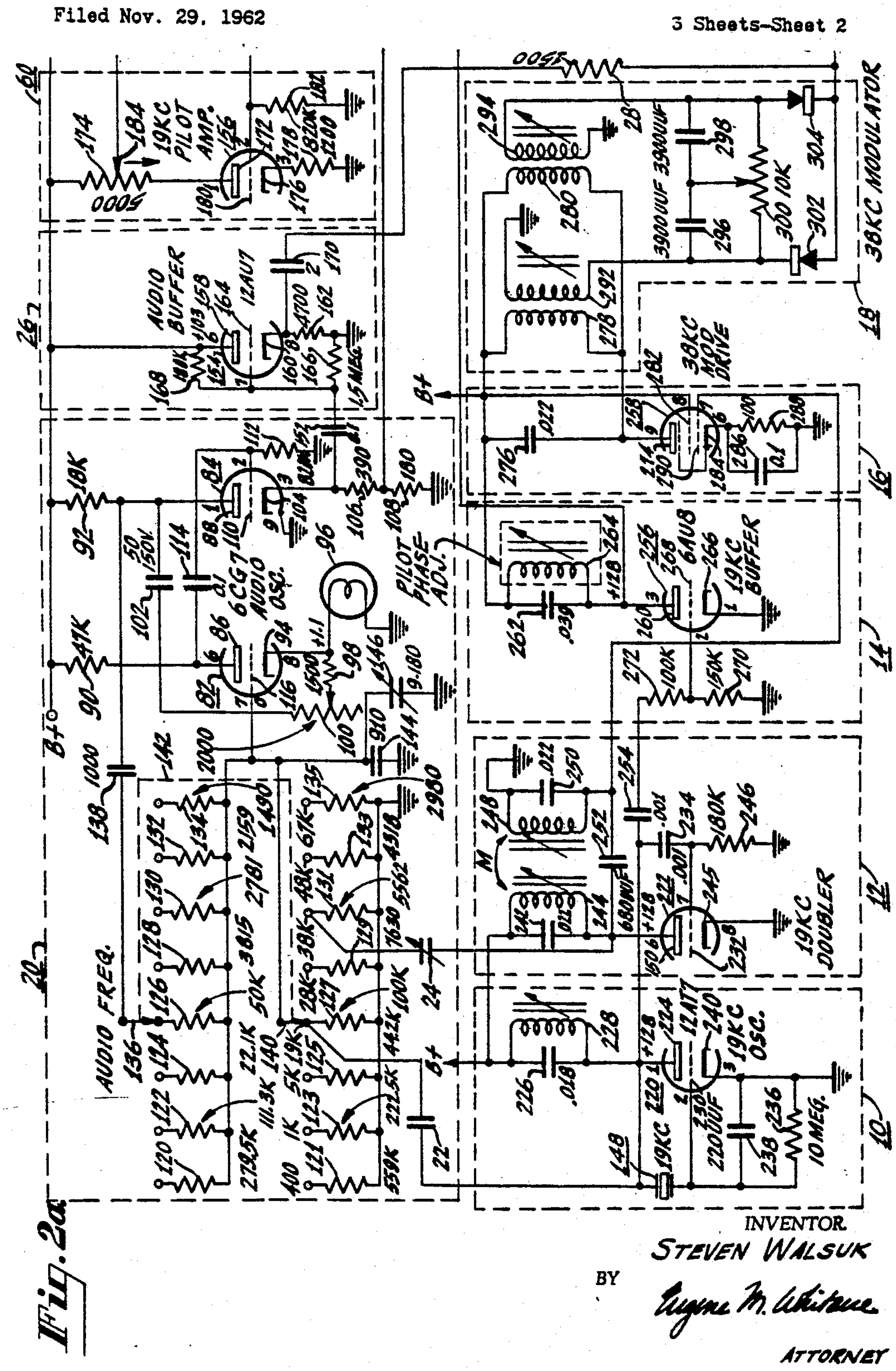
Figure 2B:
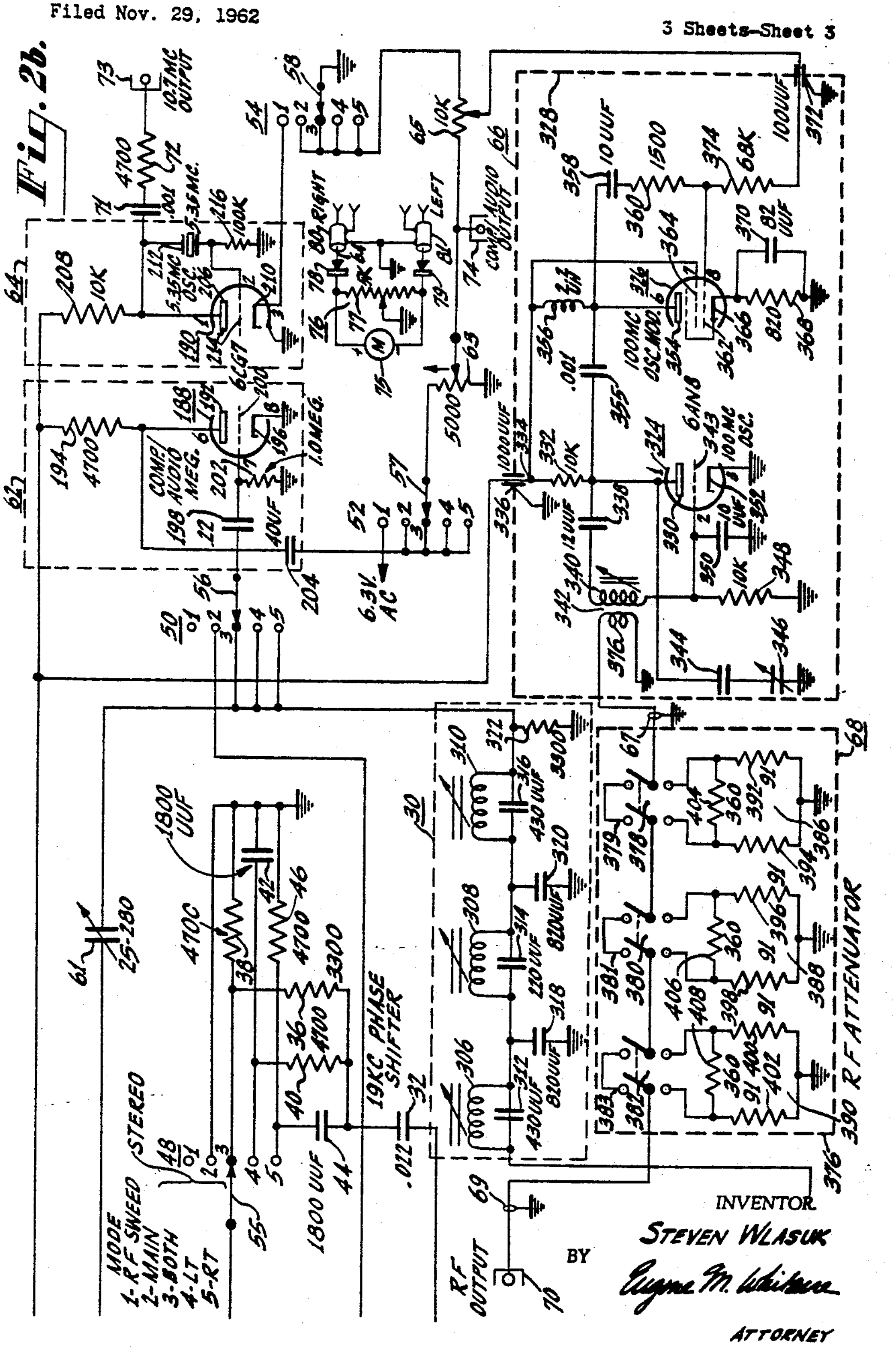

The novel features which are considered to be characteristic of this invention are set forth with particularity in the appended claims. The invention itself however, both as to its organization and method of operation, as well as additional objects and advantages thereof, will best be understood from the following description when read in conjunction with the accompanying drawings, in which:

FIGURE 1 is a block diagram of a stereophonic FM test signal generator embodying the invention; and FIGURES 2*a*, and 2*b* together comprise a detailed schematic circuit diagram of the stereophonic FM test signal generator shown in FIGURE 1.

The general layout and method of operation of the test signal generator will be described in connection with FIGURE 1. A detailed description of the several circuits indicated by blocks in FIGURE 1 will be given in connection with FIGURES 2*a* and 2*b*.

Referring first to FIGURE 1, a 19 kc. pilot oscillator 10 is provided. Waves from this pilot oscillator 10 are applied to a frequency doubler 12 and also to a 19 kc. buffer 14. Waves from the frequency doubler 12 at 38 kc. are applied to a modulator driver 16 which amplifies the 38 kc. wave applied thereto and acts to reduce back coupling between a modulator 18 and the doubler 12. The output of the modulator driver 16 is applied, in a balanced manner, to the balanced input terminals of the balanced modulator 18.

An audio oscillator 20 for producing waves of one of several frequencies including 19 kc. and 38 kc. is provided. Waves from the 19 kc. oscillator 10 may be applied to the audio oscillator 20 through a condenser 22 to stabilize the frequency of the oscillator 20 when it is adjusted to provide 19 kc. waves. Similarly, waves at 38 kc. from the frequency doubler 12 may be applied to the audio oscillator 20 through an adjustable condenser 24 to stabilize the frequency of the audio oscillator 20 when it is adjusted to provide 38 kc. waves. Output waves from the audio oscillator 20 are applied to a buffer amplifier 26 and thence, by way of resistor 28, to the single ended common input and output connection of the balanced modulator 18.

The waves appearing at the single ended output of balanced modulator 18 are applied to the input of a low-pass filter 30, having a cut-off frequency of about 60 kc. These waves include the audio wave supplied from the audio oscillator 20 and the suppressed subcarrier amplitude modulation products of the 38 kc. subcarrier and the same audio wave, as well as the harmonics of these waves. The low-pass filter 30 suppresses the harmonic frequency output waves of the balanced modulator that are above 60 kc., and passes on the audio waves and the balanced modulation products. The low-pass filter 30 is constructed in a known manner to preserve the amplitude and phase relation of the waves passed thereby.

The output of the 19 kc. buffer 14 is applied through a condenser 32 to a terminal 34. Three branch circuits extend from the terminal 34. One branch circuit comprises resistors 36 and 38 connected in series between the terminal 34 and ground. A second branch circuit comprises a resistor 40 and a condenser 42, connected in the order named, between the terminal 34 and ground. The third branch comprises a condenser 44 and a resistor 46, connected in the order named, between the terminal 34 and ground. The wave at the junction of the resistors 36 and 38 is in phase with the wave at terminal 34. The resistor 40 and the condenser 42 are so proportioned that the wave at the junction thereof is at 45° lagging phase with respect to the wave at the terminal 34. The condenser 44 and the resistor 46 are so proportioned that the wave at the junction thereof is 45° leading with respect to the wave at the terminal 34.

A plurality of ganged or unicontrolled switches 48, 50, 52 and 54 are provided. In physical embodiment, the switches 48, 50, 52 and 54 may comprise insulating disks each carrying a conductor cooperating with stationary contacts, said disks being mounted on a rotatable insulating shaft (not shown) for unicontrolled operation. A front panel knob (not shown) on the shaft may be provided for rotating the shaft of the switches 48, 50, 52 and 54. Each switch is schematically shown in the drawing as comprising five stationary contacts 1, 2, 3, 4 and 5 positioned in line and a respective sliding contactor 55, 56, 57 and 58 for each of the switches 48, 50, 52 and 54. The ganging of the switches is indicated by the dotted lines 59. The switch sliders and all but two of the contacts are connected to the various elements of the test instrument circuit to provide different test waves, as will be explained.

Contact 1 of switch 48 is not used. Contact 2 of switch 48 is connected directly to ground. Contact 3 of switch 48 is connected to the junction of the resistor 36 and 38. Contact 4 of switch 48 is connected to the junction of the resistor 40 and the condenser 42, and contact 5 of switch 48 is connected to the junction of the condenser 44 and the resistor 46. The slider 55 is connected to the input of a 19 kc. pilot amplifier 60.

Contact 1 of switch 50 is not used. Contact 2 of switch 50 is connected to an additional output connection of the audio oscillator 20. Contacts 3, 4 and 5 of switch 50 are connected together, to the output of 19 kc. pilot amplifier 60 through a variable condenser 61 and to the output of low-pass filter 30. The slider 56 of switch 50 is connected to the input of a composite audio amplifier 62.

Contact 1 of switch 52 is connected to a source of 6.3 volt A.C. Contacts 2, 3, 4 and 5 of switch 52 are connected together, and to the output of the composite/audio amplifier 62. The slider 57 of switch 52 is connected to ground through the resistance of a potentiometer 63.

Contact 1 of switch 54 is connected to a 5.35 mc. oscillator 64. When the slider 58 of switch 54 is in its 1 position, that is, when slider 58 makes electrical connection with contact 1 of switch 54, oscillator 64 is energized, as will be more fully explained. Contacts 2, 3, 4 and 5 of switch 54 are connected together and through the resistance of a potentiometer 65 to the slider of potentiometer 63. The slider 58 of switch 54 is grounded.

The slider of potentiometer 65 is connected to the modulating input of a 100 mc. oscillator and frequency modulator (modulator-oscillator) 66. The frequency modulated wave produced in the modulator-oscillator 66 is fed, by way of a shielded cable 67 to an attenuator 68. The output of the attenuator 68 is fed by way of a shielded cable 69 to an output connection 70 which may be a receptable mounted on the front panel of the container for the test instrument. The modulated radio frequency wave which appears at receptacle 70 is one of the output waves supplied for testing an FM receiver.

The output of the 5.35 mc. oscillator 64 may be applied by way of condenser 71 and resistor 72 to receptacle 73 which may also be mounted on the front panel. The wave appearing at receptacle 73 comprises the fundamental wave of 5.35 mc. and many harmonics of this wave. The wave is a second output wave provided by the heredescribed instrument.

A receptacle 74 which may also be mounted on the instrument front panel, is connected to the slider of the potentiometer 63. A third or composite/audio output wave appears at receptacle 74.

The several circuits set up at the several positions of the switches 48, 50, 52 and 54 will now be described. Upon moving the sliders 55, 56, 57 and 58 to the position where they make electrical connection with their respective contacts 1, that is to position 1, an adjustable portion of the 6.3 volts A.C. wave appearing at contact 1 of switch 52 is applied to receptable 74 by way of the slider 57 and an adjustable portion of the potentiometer 63 in series. The 6.3 volts wave appearing at the slider of potentiometer 63 is also applied to the modulating input connection of the modulator-oscillator 66 through an adjustable part of potentiometer 65. A frequency modulated radio frequency wave, produced by the modulator-oscillator 66, will appear at the receptacle 70. This R.F. wave will have a frequency swing determined by the voltage amplitude of the wave appearing at the input to the modulator-oscillator 66 and the amplitude of this R.F. wave will be determined by the setting of the attenuator 68. Also, at position 1 of the several switches, energizing voltage will be applied to the 5.35 mc. oscillator 64, whereby 5.35 mc. waves and the harmonics thereof will appear at the receptacle 73.

By applying the wave at receptacle 73 to the antenna connection of a receiver under test, the dial calibration of the receiver may be checked. This check may be performed by observing the indication of an oscilloscope (scope) or meter, for example (not shown), connected to the detector output connection of the receiver as the tuner of the receiver is adjusted through this range. The meter or scope will respond to harmonics of the 5.35 mc. wave at positions of the tuner corresponding to the reception of a 90.95 mc., a 96.30 mc., a 101.65 mc. and 107.00 mc. carrier wave. The relaitve position of the dial and the tuner position indicator cooperating therewith may be adjusted if necessary to provide proper tuning indication.

At position 1 of the several switches, a frequency modulated R.F. wave will also be applied to receptacle 70. This wave as well as the wave appearing at receptacle 73 may be applied to the antenna connection of FM receiver under test to check the tuning of the I.F. transformers of the receiver, by observing the effect of these two waves on a scope connected to the input of the second detector. The double frequency 10.7 mc. wave appearing at this receptacle 73 acts as a frequency marker on the scope indication. It is noted that a single 5.35 mc. oscillator 64 provides test frequency waves for checking dial calibrations and also for assisting in checking the tuning of the I.F. transformers of a receiver.

The wave provided at receptacle 70 may be used to check the tuning of the receiver second detector and also to check the response curve of the receiver second detector to output voltage as the input frequency is varied and also to check the point at which the output voltage of the second detector goes through zero as the input frequency is varied. These tests may be made by observing a properly connected oscilloscope (not shown), as is known to operators of test equipment.

Upon setting the switches 48, 50, 52 and 54 to their position 2, the input of the 19 kc. amplifier 60 is grounded by slider 55, and the second output of audio oscillator 20 is connected to the input of the composite/audio amplifier 62. The output of the composite/audio amplifier 62 is connected through an adjustable portion of the potentiometer 63 and 65 to the modulating input of modulator-oscillator 66. At this setting, and at all further settings, of the switches, the 5.35 mc. oscillator is deenergized whereby no output is applied to receptacle 73. At the position 2 setting of the switches, an adjustable portion of an audio-frequency wave will be applied to receptable 74 from the audio/oscillator 20. The frequency of the audio wave appearing at the receptacle 74 depends on the adjustment of oscillator 20 and the amplitude of this wave is determined by the setting of the slider of the potentiometer 63. The wave appearing at the receptacle 74 may be used to test audio apparatus or the audio portion of a radio receiver.

At this position 2 setting of the instrument, a radio frequency wave, frequency modulated by an adjustable portion of the wave produced by audio-oscillator 20 appears at receptacle 70. The portion of the audio frequency wave produced by the audio-oscillator 20 that is applied to the modulator-oscillator 66 may be adjusted in amplitude by means of the potentiometers 63 and 65 to determine the frequency swing of the R.F. wave appearing at the receptacle 70. The amplitude of this R.F. wave may be controlled by adjustment of the R.F. attenuator 68. The frequency modulated R.F. wave appearing at the receptacle 70 may be applied to the antenna connection of an FM receiver to check the response thereof.

The test waves produced at positions 1 and 2 of switches 48, 50, 52 and 54 may be used to check audio equipment, the audio portions of monophonic radio receivers and monophonic FM receivers. The wave produced by the test instrument at positions 3, 4 and 5 of the switches 48, 50, 52 and 54 are useful for checking stereophonic FM receivers, stereophonic adapters for monophonic radio receivers and the audio portions of stereophonic receivers.

For observing the effect of sterophonic test waves on a stereophonic apparatus under test, a meter 75 and a circuit means 76 for connecting the meter 75 to the R and the L outputs of the stereophonic apparatus to be tested is provided. The meter 75 may be mounted on the front panel of the test instrument. The circuit means 76 comprises a potentiometer 77 whose slider is grounded. The meter 75 is connected across the resistance of the potentiometer 77. An electrode of a rectifier 78 is connected to one end of the resistance of potentometer 77 and the like electrode of a further rectifier 79 is connected to the other end of the resistance of potentiometer 77. The other electrodes of rectifiers 78 and 79 are connected respectively to the inner conductors of concentric cables 80 and 81. The inner conductor of cable 80 is connected to the right hand or R speaker output connection of the stereophonic apparatus under test and the inner conductor of cable 81 is connected to the left hand or L speaker output connection of the apparatus. The outer conductors or shields of concentric cables 88 are connected to the ground connection of the instrument and to the loudspeaker return connections of the apparatus under test.

As stated, the test instrument at positions 3, 4 and 5 of its switches 48, 50, 52 and 54 provides test waves for checking stereophonic apparatus. At position 3 of these switches, a 19 kc. wave is fed from the terminal 34 by way of the resistor 36 and the slider 55 of switch 48 to the input of 19 kc. pilot amplifier 60. The output of this amplifier 60 is applied through the variable condenser 61 to the contacts 3, 4 and 5 of switch 50. Waves from the low-pass filter 30 are also applied to the contacts 3, 4 and 5 of switch 50, whereby a composite wave comprising an audio wave, the suppressed subcarrier components of this audio wave and a subcarrier wave of 38 kc., and a 19 kc. pilot wave, appears at contacts 3, 4 and 5 of switch 50. The composite wave at contact 3 of switch 50 is applied to the input of the composite/audio amplifier 62 and thence to the contacts 2, 3, 4 and 5 of switch 52. The amplified composite wave appearing at contact 3 of switch 52 is applied, through an adjustable portion of the potentiometer 63 to the composite/audio output receptacle 74, and through an adjustable part of both potentiometers 63 and 65 to the input of the modulator-oscillator 66. Thereby, an adjustable portion of the composite wave appears at the receptacle 74. Also, radio frequency waves, modulated in frequency by the composite wave appears at receptacle 70. The wave at receptacle 70 may be applied, by means of a shielded lead, not shown, to the antenna connection of a stereophonic FM receiver under test. If a stereophonic adapter for a monophonic receiver, or if only the audio and subcarrier portion of a stereophonic receiver is to be tested, the composite wave appearing at receptacle 74 is applied to the input of the adapter or to the output connection of the second detector of the stereophonic receiver. At this number 3 position of the several switches, the needle of the meter 75 should take a midscale position when the wave appearing at receptacle 74 is applied to a properly adjusted receiver or adapter.

Upon shifting the switch sliders 55, 56, 57 and 58 to their position 4, the only change that takes place is that the 19 kc. pilot wave from buffer 14 will be applied through the phase shifter 40, 42 to the pilot amplifier 60. The effect of the phase shifter 40, 42 is to shift the phase of the 19 kc. pilot wave 45° lagging with respect to its phase at the terminal 34 and at contact 3 of switch 48. Therefore, the composite wave appearing at contact 4 of switch 50 will comprise the audio wave from audio oscillator 20, the suppressed subcarrier modulation products from low-pass filter 30 and the 19 kc. pilot wave at 45° lagging with respect to its phase when the switches were at position 3. This composite wave is applied to composite/audio amplifier 62 through switch slider 56 of switch 60. The amplified composite wave is applied through the switch slider 57 of the switch 52 to the potentiometer 63 and an adjustable portion of this wave appears as a composite wave at the output receptacle 74. An adjustable portion of the composite wave is also applied by way of the slider of the potentiometer 65 to the modulation input of the modulator-oscillator 66, and thence through the attenuator 68 to the R.F. receptacle 70.

Upon shifting the position of the sliders 55, 56, 57 and 58 to position 5 of the switches, the only change that takes place is that the pilot wave is applied to the composite-audio amplifier 62 by way of the phase shifter 44, 46. Therefore, the composite wave that arrives at receptacle 74 comprises an adjustable portion of the audio wave from audio-oscillator 20, the subcarrier suppressed modulation products from modulator 18, and the 19 kc. pilot at a 45° leading phase with respect to its phase when the switches were at position 3. The wave at receptacle 70 is therefore the radio frequency produced by the modulator-oscillator 66, modulated in frequency by an adjustable portion of the composite wave applied to the receptacle 74.

To assist in explaining the operation of this test instrument, a short explanation of the operation of a stereophonic receiver according to present standards may be helpful. The broadcast R.F. wave frequency modulated by a composite wave is received by the stereophonic receiver. The composite wave comprises the $L+R$ signals or information, and 19 kc. pilot and the suppressed subcarrier amplitude modulation products of a 38 kc. subcarrier and the $L-R$ signals or information. Circuits in the receiver demodulate the received FM wave and separate the $L+R$ information from the 19 kc. pilot and the suppressed carrier modulation products. An $L+R$ channel of the receiver applies the $L+R$ information to one input of a matrixing circuit. An $L-R$ channel of the receiver produces a 38 kc. wave controlled in phase by the 19 kc. pilot. The 38 kc. wave so produced is used as a restored subcarrier to demodulate the modulation products of the 38 kc. wave and the $L-R$ information. The phase difference between the 38 kc. restored carrier produced in the receiver and the modulation products is twice the phase difference between the 19 kc. pilot wave and the modulation products. The $L-R$ modulation products are detected or demodulated in the $L-R$ channel and the $L-R$ wave is applied to the other input of the matrixing circuit. For proper operation of the receiver to demodulate the suppressed subcarrier modulation products, the restored subcarrier must have the proper phase relation with respect to the 38 kc. subcarrier modulation products. A means is therefore provided in the receiver to shift the phase of the restored subcarrier with respect to the 19 kc. pilot and therefore with respect to the suppressed subcarrier modulation products to obtain this correct phase relation. The two outputs of a properly balanced matrixing circuit, upon application of $L+R$ and $L-R$ information to the two inputs thereof, represent separated L and R information. Stereophonic radio receivers usually also include matrix balancing means to aid in properly balancing the matrixing circuits thereof.

A 100 mc. output wave appearing at receptacle 70 is like the FM broadcast wave carrying stereophonic information in that the 100 mc. carrier-wave produced by the described instrument is frequency modulated by a composite wave comprising three components. The wave produced by the described test instrument differs from the broadcast wave carrying stereo information in that the $L+R$ and the $L-R$ information of the test wave is the same audio wave, and further in that the 19 kc. pilot may be supplied by this instrument in three phase relationships with respect to 38 kc. suppressed subcarrier modulation products. At one of these phase relationships, corresponding to position 3 of the several switches, the restored subcarrier produced in the receiver in response to the 19 kc. pilot wave will have a phase such as to provide zero output when the 38 kc. demodulator contained in the $L-R$ channel is properly adjusted. At the second of these phase relationships, corresponding to position 4 of the several switches, the restored subcarrier produced in the receiver in response to the 19 kc. pilot wave will have such phase that the $L-R$ demodulation products, that is, the information output from the $L-R$ channel, will be in phase with and equal to the $L+R$ information when the subcarrier demodulator and matrix circuits are properly adjusted. At the third of these phase relationships, corresponding to position 5 of the several switches, the restored subcarrier produced in the receiver in response to 19 kc. pilot wave will have such phase that the $L-R$ demodulation products, that is, the information output of the $L-R$ channel, will be 180° out of phase with and equal to the $L+R$ information when the subcarrier demodulator and matrix circuits are properly adjusted.

When the switches 48, 50, 52 and 54 are in position 3, and the R.F. wave appearing at receptacle 70 is applied to the antenna connection of a radio receiver under test, the right and left speaker outputs of the receiver should be equal. In this position of the switches, the 19 kc. pilot will have such phase relation with respect to the suppressed subcarrier modulation products that the restored subcarrier controlled in phase thereby will be in 90° relation with respect to the suppressed subcarrier modulation products and there should be no output from the $L-R$ channel of the receiver under test. The $L+R$ information, applied to one input of the matrixing circuit will be divided thereby and will therefore appear equally at the L and at the R outputs of the matrixing circuit, and the indicator needle of meter 75 will take a middle position of its scale.

At the position 4 of the test instruments, the 19 kc. pilot component of the composite wave produced by the test instrument is at such phase that the 38 kc. subcarrier produced in the receiver in response to the 19 kc. pilot wave is at zero degrees with respect to the 38 kc. modulation products. In the receiver under test, therefore, two nearly identical audio waves, which are in phase with each other, will be applied to the two inputs of the matrixing circuit of the receiver. Therefore, there will be an output wave from the L output connection of the matrixing circuit and substantially no output wave from the R output connection thereof. The fact that only an L output wave is produced by the receiver will be shown by the position of the indicator of meter 75.

At the 5 position of the test instrument switches, the 19 kc. pilot component of the composite wave produced by the test instrument is at such phase with respect to the subcarrier modulation products that the restored subcarrier produced in the receiver under test will be 180° out of phase with respect to the subcarrier modulation products.

Therefore two nearly identical waves will be applied to the two input connections in the receiver to the matrixing circuit thereof, but the two waves will be 180° out of phase with respect to each other. There will then be substantially no L output from the matrixing circuit of the receiver and only R output therefrom, as will be shown by the position of the indicator meter 75.

If the indications of the meter 75 are not as noted above, manipulation of the restored subcarrier phase control and of the matrixing balancing means of the stereophonic receiver under test may be necessary. Since the stereophonic tests described above are severe ones, it may not be possible to adjust the receiver for perfect stereophonic response and the adjustment of the receiver should be made as nearly correct as possible.

The circuits of the several elements of the test instrument indicated by the rectangles in FIGURE 1 are shown in detail in 2*a* and 2*b* which together comprise a schematic circuit diagram of the above-described instrument. The audio oscillator indicated by rectangle 20 of FIGURE 1 is shown schematically in FIGURE 2*a* and is described first.

The audio oscillator 20 comprises a pair of electron tubes 82 and 84, shown as sharing one envelope. Positive supply voltage is applied to the anodes 86 and 88 of respective tubes 82 and 84 from B+ through respective resistors 90 and 92. The cathode 94 of tube 82 is connected to ground through a tungsten lamp bulb 96 which varies in resistance with current passing through it, and therefore acts as a degenerative bias resistor to control the amplitude of the oscillator output. Cathode 94 is also connected to the anode 88 of tube 84 through a resistor 98 and an adjustable portion of resistor 100 and a condenser 102 in series. The cathode 104 of the tube 84 is connected to ground through output resistors 106 and 108 in series. The grid 110 of tube 84 is connected to ground through a resistor 112 and to the anode 86 of the tube 82 through a condenser 114. The grid 116 of tube 82 is connected to one terminal 118 of a plurality, here shown as 8, resistors 120, 122, 124, 126, 128, 130, 132 and 134. The grid 116 is also connected to ground through a condenser 144 and a variable, trimmer condenser 146 connected in parallel. The grid 116 is further connected to a slidable contactor 140. A further slidable contactor 136 is connected through a condenser 138 to the anode 88. The slidable contactor 140 contacts the free end of a plurality, here shown as 8, resistors 121, 123, 125, 127, 129, 131, 133 and 135, and the other ends of these resistors are grounded. As is indicated by dotted line 142, contactors 136 and 140 may be unicontrolled. In actual construction, contactors 136 and 140 may be fixed to an insulating rotatable shaft which extends from the front panel of the container of the test instrument and connections to the free ends of resistors 120–135 may be arranged to be contacted by their respective contactors upon rotation of the shaft, in a known manner.

The frequency of the audio oscillator 28 is determined by the capacitors 138 and 144 and 146 together with whichever of resistors 120–135 that are connected to the grid 116 and anode 88. A connection from the piezoelectric crystal 148 through condenser 22 to the free end of the resistor 127 stabilizes the frequency of the oscillator 20 at cystal frequency when the sliders 136 and 140 contact the free ends of their respective resistors 127 and 126. A connection from the frequency doubler tube anode 150 through a variable condenser 24 to the free end of a further resistor 131, stabilizes the frequency of the audio oscillator 128 at double the frequency of the crystal or at 38 kc. when the sliders 136 and 140 contact the free ends of resistors 131 and 130. The free running frequencies of the oscillator 20 may be adjusted by setting the oscillator 20 to produce 19 kc. or 38 kc. and by adjusting the trimmer condenser 146 to the center of the range of adjustment thereof that causes production of 19 kc. or 38 kc. output waves. An output of oscillator 20 is taken from the cathode 104 through condenser 152 and is applied to audio buffer 26. Another output is taken between resistors 106 and 108 and is applied to contact 2 of switch 50.

Audio buffer 26 comprises a vacuum tube 154, here shown as sharing the same envelope with a tube 156 which is included as part of the 19 kc. pilot amplifier 60. The anode 158 of the tube 154 is connected to B+ and its cathode 160 is connected to ground through a resistor 162. The grid 164 of tube 154 is connected to the condenser 152, to ground through a resistor 166 and to the anode 158 through a resistor 168. Output of audio buffer 26 is taken from the cathode 160 through a condenser 170 and is applied by way of the resistor 28 to the common terminal of the modulator 18 and the low-pass filter 30.

The pilot amplifier 60 comprises a tube 156 (here shown as sharing an envelope with tube 154) whose anode 172 is connected to B+ through the resistance of a potentiometer 174 and whose cathode 176 is connected to ground through resistor 178. The input of pilot amplifier 60, compising the grid 180 of tube 156, is connected to ground through resistor 182 and to the slider 55 of the switch 48. The output of pilot amplifier 60 is taken from the slider 184 of potentiometer 174 through the variable condenser 61 and applied to contacts 3, 4 and 5 of the switch 50. The potentiometer 174 may be mounted on the front panel of the test instrument to permit adjustment of the level of the pilot wave with respect to the other components of the composite wave. The condenser 61, mounted so as not to be accessible from the front panel, is adjusted to set the maximum amplitude of the pilot wave. Due to its small size, variation of condenser 61 has very little effect on the phase of the pilot wave.

The composite/audio amplifier 62 (FIG. 2*b*) comprises a tube 188 (here shown as sharing an envelope with a tube 190 of the 5.35 mc. oscillator 64 to be described), whose anode 192 is connected to B+ by way of a resistor 194, and whose cathode 196 is grounded. Input is applied to the grid 200 of the tube 188 of the amplifier 62 from the slider 56 of switch 50 through a condenser 198. The grid 200 is connected to ground through a resistor 202. Output from the amplifier 62 is taken from the anode 192 and applied through a condenser 204 to contacts 2, 3, 4 and 5 of switch 52.

The 5.35 mc. oscillator 64 includes a tube 190 (here shown as sharing a tube envelope with the tube 188 of amplifier 62), whose anode 206 is connected to B+ through a resistor 208 and whose cathode 210 is connected to the contact 1 of switch 54. A 5.35 mc. crystal 212 is connected between the anode 206 and the grid 214 of tube 190. The grid 214 is connected to ground through a resistor 216. Output is taken from the oscillator 64 at its fundamental frequency 5.35 mc. and at any of its harmonics by way of an output receptacle 73 connected through a resistor 72 and condenser 71 to the anode 206. It will be noted that unless the slider 58 of switch 54 is in its 1 position, no voltage is supplied to the tube 190 and the oscillator 64 is deenergized.

The 19 kc. oscillator 10 (FIG. 2*a*) comprises a tube 220, here shown as sharing the same envelope with the tube 222 of the frequency doubler 12. The anode 224 of tube 220 is connected to B+ through a 19 kc. tuned circuit comprising a condenser 226 and an inductor 228 connected in parallel. The anode 224 is also connected to the grid 230 of the tube 220 through the 19 kc. crystal 148. The grid 230 is also connected through a resistor 236 and a condenser 238 in parallel to the cathode 240 of the tube 220 and to ground. Output from the oscillator 10 is taken from anode 224 and applied to the grid 232 of the tube 222 of frequency doubler 12 through a condenser 234. Output from the oscillator 10 is also applied to the 19 kc. buffer 14 from the anode 224 by way of a condenser 254.

The frequency doubler 12 comprises the tube 222 whose anode 150 is connected to B+ through a 38 kc. parallel tuned circuit comprising a condenser 242 and an inductor 244 connected in parallel. The cathode 245 of tube 222 is connected directly to ground. The grid 232 of tube 222, which, as above stated, is connected to anode 224, is also connected to ground though a resistor 246. A further tuned circuit also tuned to 38 kc. and comprising parallelly connected inductor 248 and capacitor 250 is inductively coupled to inductor 244. One end of the tuned circuit 248–250 is connected to ground and the other end of the tuned circuit 248–250 is connected to the anode 150 by way of a capacitor 252. Output at 38 kc. is taken from the frequency multiplier 12 at the junction of the tuned circuit 248–250 with the condenser 252.

The 19 kc. buffer 14 comprises a tube 256 (here shown as sharing an envelope with the tube 258 of the modulator driver 16) whose anode 260 is connected to B+ through parallel connected condenser 262 and phase adjusting inductor 264, and whose cathode 266 is connected directly to ground. The grid 268 of the tube 256, comprising the input of buffer 14, is connected to ground through a resistor 270 and to the condenser 254 through a resistor 272. The output from the amplifier 14, in correct phase adjustment with respect to the modulation products of the modulator 18, is taken from the anode 260 and is connected to one terminal of the blocking condenser 32. This proper phase adjustment is attained by adjusting the value of the inductor 264 as by moving an iron core thereof with respect to the inductor winding.

The modulator driver 16 includes a tube 258 (here shown sharing an envelope with tube 256) whose anode 274 is connected to B+ through the parallel connection of a condenser 276 and two transformer primary windings 278 and 280. The screen grid 282 of tube 258 is directly connected to B+ and the cathode 284 thereof is connected to ground through the parallel connection of a condenser 286 and a resistor 288. The suppressor grid of the pentode tube 258 is directly connected to the cathode 284 thereof. Input is applied to the grid 290 of the pentode tube 258 from tuned circuit 248–250. Primary windings 278 and 280 constitute parallel connected output means for driver 16.

Modulator 18 comprises transformer secondary windings 292 and 294 which are coupled respectively to primary windings 278 and 280. One end of each secondary winding 292 and 294 is connected to ground. The windings 292 and 294 are so wound that their ungrounded ends have opposite polarities with respect to ground. The ungrounded end of each secondary winding 292 and 294 is connected through a respective condenser 296 and 298 to ground. These ungrounded ends of secondary winding 292 and 294 are also connected to respective ends of a potentiometer resistor 300 whose slider is connected to ground. These ungrounded ends are further connected to a terminal of a respective detector element 302 and 304. The other terminals of the detector elements 302 and 304 are connected to each other. The detectors 302 and 304 are poled in the same direction around the loop including the potentiometer 300 and detector elements 302 and 304. A subcarrier-wave at 38 kc. is applied to modulator 18 by means of transformer primary windings 278 and 280. Audio input waves are applied to modulator 18 and suppressed subcarrier modulation products may be taken from modulator 18 at the common connection of the two detectors 302 and 304. The audio wave which is applied between modulator 18 and low-pass filter 30 becomes $L+R$ information. This same audio wave modulates the 38 kc. subcarrier and therefore becomes $L-R$ information. The $L+R$ information and the $L-R$ modulation products are passed on (to the 100 mc. oscillator) through circuits that maintain the relative phase relation and amplitude of waves passing therethrough, and therefore unchanging phase relation between the $L+R$ and the $L-R$ information is assured.

The low-pass filter 30 (FIG. 2*b*) comprises three inductors 306, 308 and 310, connected in series and each connected in parallel with a respective condenser 312, 314 and 316. The common connection of the inductors 306 and 308 is connected to ground through a condenser 318, and the common connection of inductors 308 and 310 is connected to ground through a condenser 320. Waves are applied to the low-pass filter 30 from modulator 18 and from buffer 26. Low-pass filter 30 has a cut-off frequency of about 60 kc. Filter 30 is designed in a known manner to maintain the amplitude and phase relation of the waves passing therethrough. Output is taken from the low-pass filter 30 across a resistor 322 which is connected between the other terminal of the third inductor 310 and ground. The output from filter 30 is applied to contacts 3, 4 and 5 of switch 50.

The 100 mc. modulator-oscillator 66 is enclosed in a shield 328. The modulator-oscillator 66 includes two tubes 324 and 326, here shown as sharing the same envelope. The anode 330 of the tube 324 is connected through a resistor 332 to a lead 334 that is connected through a feed-through capacitor 336 to B+. The anode 330 is also connected through the series connection of a condenser 338 and the primary 340 of a transformer 342 to the grid 343 of the tube 324, and through a condenser 344 and a variable condenser 346 in series to ground. Variable condenser 346 may be mounted so that it is controllable from the front panel of the stereo instrument and may be used to adjust the unmodulated frequency of oscillator 66 over a range of about 1.5 mc. The grid 343 of tube 324 is also connected to ground by way of a parallel connected resistor 348 and a condenser 350. The cathode 352 of the tube 324 is connected directly to ground. The anode 354 of the modulator tube 326 is connected through a condenser 355 to the anode 330. The anode 354 is also connected through an inductance 356 to the lead 334 and through a condenser 358 and a resistor 360 in series to the control grid 362 of tube 326. The screen grid 364 of the tube 326 is connected directly to lead 334. The cathode 366 of the tube 326 is connected to ground through the parallel connection of a condenser 370 and a resistor 368, and to the suppressor grid of the tube 326. Due to the described connection of the tube 326, it acts as a capacity which is variable between limits in accordance with the control potential applied to the control grid 362 thereof. Control potential is applied to the grid 362 from the slider of the potentiometer 65 through a feed-through capacitor 372 and a resistor 374. The oscillator-modulator 66 provides, in a known manner, a wave of about 100 mc. (depending on the setting of condenser 346), frequency modulated in accordance with potential applied to the grid 362. The output of 100 mc. oscillator is taken from the secondary winding 376 of the transformer 342. Secondary winding 376 is connected between ground and the shielded input lead 67. Lead 67 is connected to radio frequency attenuator 68.

The radio frequency attenuator 68 is included in a shield 376. The attenuator 68 includes a plurality of double-pole, double-throw switches (here shown as 3) each having an upper and a lower pair of terminals, as diagrammatically shown in FIG. 2*b*. One pole of one switch 378 is connected to the input lead 67 and one pole of another switch 382 is connected to a shielded output lead 69. The two poles of the switch 380 are respectively connected to the remaining poles of the switches 378 and 382. The upper pair of terminals of each switch 378, 380 and 382 are shorted together as shown at 379, 381 and 383. Resistance networks 386, 388 and 390 are connected respectively between the lower pairs of terminals of each switch 378, 380 and 382. The networks 386, 388 and 390 each includes a respective resistor 404, 406 and 408 connected across the lower pairs of switch terminals. Each of these resistance networks 386, 388 and 390 also includes respective pairs of resistors 392 and 394, 396 and 398, 400 and 402. Resistors 392 and 394 are connected between the ends of resistor 404 and ground. Resistors 396 and 398 are connected between the ends of resistor 406 and ground. Resistors 400 and 402 are connected between the ends of resistor 408 and ground. Output receptacle 70 is connected to output lead 69. To adjust the attenuator 68, the switches 378, 380 and 382 may be individually shifted to their upper or to their lower positions as viewed in FIGURE 2*b*. In the upper position of any switch 378, 380 or 382 the resistance network shown below the switch is not connected in the attenuator circuit.

As indicated in the drawings, inductances or windings 228, 244, 248, 264, 292, 294, 306, 308, 310 and 340 may have adjustably positionable iron cores for tuning purposes.

What is claimed is:

1. In a test instrument for stereophonic frequency modulation receivers, means for producing a composite wave comprising means for producing the suppressed subcarrier modulation products of an audio wave and a subcarrier wave, means for adding said audio wave to said modulation products, means for producing a pilot wave of subharmonic frequency with respect to said subcarrier wave, phase shifting means coupled to said pilot wave producing means for providing said pilot wave at a plurality of different time relations with respect to said subcarrier wave, a first of said time relations corresponding to a pilot wave whereof the amplitude passes through zero substantially simultaneously with passage of said subcarrier wave through a maximum amplitude, and second and third ones of said time relations corresponding to pilot waves shifted by equal but opposite phase angles from the pilot wave having said first time relation with respect to said subcarrier wave, and means for adding said pilot wave to the sum of said modulation products and said audio wave whereby the single audio wave, upon processing in a stereophonic radio receiver, simulates the reception of equal left and right or only left or only right audio channel signals dependent upon the time relation of said pilot wave with respect to said subcarrier wave.

2. In a test instrument, means for producing a composite wave comprising an audio frequency oscillator, a pilot frequency oscillator, a frequency doubler, a modulator having a balanced input circuit and a second input circuit serving as a common input and output circuit, a low-pass filter and a multi-output phase shifter, said phase shifter providing, at the operating frequency of said pilot frequency oscillator, phase shifts of zero degrees, plus forty-five degrees and minus forty-five degrees, means for coupling said pilot frequency oscillator to said frequency doubler, means for coupling said frequency doubler in a balanced manner to said balanced input circuit of said modulator, means for coupling said audio frequency oscillator to said second input circuit of said modulator, means for coupling said audio frequency oscillator and said second input circuit serving as a common input and output circuit to the input of said low-pass filter, and means including said phase shifter for coupling said pilot frequency oscillator to the output of said low-pass filter, whereby a composite wave appears at the output of said low-pass filter, said composite wave producing means being arranged such that the time delay encountered by a wave at pilot frequency along the circuit path between said pilot frequency oscillator and the input of said phase shifter on the one hand and the time delay encountered by a wave at twice pilot frequency along the circuit path between said pilot frequency oscillator and the output of said low-pass filter on the other hand are related such that the amplitude of a wave at pilot frequency observed at the input to said phase shifter passes through zero substantially simultaneously with the passage through its maximum amplitude of a wave at twice pilot frequency observed at the output of said low-pass filter.

3. In a test instrument, means for producing a composite test wave for stereophonic FM receivers which comprises a balanced modulator having a balanced input circuit and a second input circuit serving as a common input and output circuit, means for applying a subcarrier wave in a balanced manner to the balanced input of said balanced modulator, means for applying an audio frequency wave to said second input circuit of said balanced modulator, whereby said audio frequency wave and subcarrier suppressed modulation products of said subcarrier wave and said audio frequency wave appear at the output of said modulator, means for producing a wave of subharmonic frequency and predetermined time relation with respect to said subcarrier wave, and means for adding said wave of subharmonic frequency with respect to said subcarrier wave to the waves appearing at said output circuit in any one of a plurality of predetermined time relations with respect to said subcarrier wave, said time relations being selected such that, upon processing of said waves in a stereophonic radio receiver, said audio frequency wave simulates a combination of equal left and right, or only left, or only right audio channel signals in the receiver dependent upon the time relation of said wave of subharmonic frequency supplied at said adding means.

4. A signal generator for stereophonic frequency modulation receivers including:
- means for generating a composite wave comprising an audio frequency wave and a double sideband suppressed subcarrier wave amplitude modulated by said audio frequency wave,
- means providing a pilot wave of one-half the frequency of said subcarrier wave,
- phase shifting means having an input circuit coupled to said pilot wave generating means and an output circuit with a plurality of output terminals at which said pilot wave is developed respectively in a plurality of different time relations with respect to said subcarrier wave,
- switching means for selectively connecting one of said output terminals with said means for generating said composite wave to add said pilot wave in a selected one of said different time relations to said composite wave, said time relations being selected such that, upon processing of said composite wave and pilot wave in a stereophonic radio receiver, said audio frequency wave simulates a combination of equal left and right, or only left or only right audio channel signals in the receiver dependent upon the one of said output terminals selected at said switching means.

5. A signal generator for stereophonic frequency modulation receivers including:
- means for generating a composite wave comprising an audio frequency wave and a double sideband suppressed subcarrier wave amplitude modulated by said audio frequency wave,
- means for generating a pilot wave of one-half the frequency of said subcarrier wave,
- phase shifting means having an input circuit coupled to said pilot wave generating means and an output circuit with at least three output terminals at which said pilot wave is developed respectively at a reference phase and phases of plus and minus 45 degrees with respect to said reference phase, a pilot wave at said reference phase being defined as a wave at pilot frequency whereof the amplitude passes through zero substantially simultaneously with passage through a maximum amplitude of an unmodulated wave at subcarrier frequency, and
- switching means for selectively connecting one of said three output terminals with said means for generating said composite wave to add said pilot wave in a selected one of said three phases to said composite wave whereby said audio frequency wave, upon processing in a stereophonic radio receiver, simulates reception of equal left and right or only left or only right audio channel signals dependent upon the phase of said pilot wave selected at said switching means.

6. A signal generator for stereophonic frequency modulation receivers including:
- means for generating a composite wave comprising an audio frequency wave and a double sideband suppressed subcarrier wave amplitude modulated by said audio frequency wave,
- means for generating a pilot wave of one-half the frequency and of predetermined time relation with respect to said subcarrier wave, said pilot wave and said subcarrier wave being produced in time relation such that the amplitude of said pilot wave repetitively passes through zero substantially simultaneously with passage of said subcarrier wave through its maximum amplitiude,
- phase shifting means including an input terminal coupled to said pilot wave generating means, said phase shifting means having three parallel branch circuits, a first branch circuit including a pair of resistors connected in series between said input terminal and a point of reference potential, a second branch circuit including a resistor and capacitor connected in the order named between said input terminal and said point of reference potential, a third branch circuit including a capacitor and a resistor connected in the order named between said input terminal and said point of reference potential, the capacitor and resistor elements of said second and third branch circuits proportioned to shift the phase of the pilot wave appearing at the junction of the elements of the second and third branch circuits 45 degrees in opposite directions from the phase of the pilot wave appearing at the junction of the resistors of the first branch circuit, and
- switching means for selectively connecting the junction of the elements of any one of the branch circuits with said means for generating said composite wave to add said pilot wave in a selected one of said three phases to said composite wave, whereby said audio frequency wave, upon processing of the combination of said pilot wave and said composite wave in a stereophonic radio receiver, produces a simulated effect of equal left and right, or only left or only right audio channel signals dependent upon the phase shift selected for said pilot wave at said switching means.

7. A test signal generator for stereophonic frequency modulation receivers of the type adapted to receive a composite stereophonic signal including (1) an audio frequency signal corresponding to the sum of a pair of stereophonically related signals; (2) a double sideband suppressed subcarrier wave amplitude modulated by the difference between said pair of stereophonically related signals; and (3) a pilot signal of one-half the frequency of said suppressed subcarrier wave comprising:

a balanced modulator including a balanced input circuit for a subcarrier wave and an unbalanced input circuit for a modulating wave, means for applying a subcarrier wave to said balanced input circuit, means for applying an audio frequency wave to said unbalanced input circuit, output circuit means coupled to said unbalanced input circuit for combining said audio frequency wave and a double sideband suppressed subcarrier wave amplitude modulated with said audio frequency waves wherein said audio frequency wave serves the dual purpose of corresponding to the sum of said stereophonically related signals and also to the difference between said stereophonically related signals, means generating a wave having a frequency corresponding to that of said pilot signal, phase shifting means coupled to said wave generating means and having at least three output terminals for delivering said pilot wave respectively at a reference phase and at two additional unlike phases, said two additional phases each being displaced 45° from said reference phase and said reference phase corresponding to a pilot wave whereof the amplitude passes through zero substantially simultaneously with passage of an unmodulated subcarrier wave through its maximum amplitude, and switching means for selectively coupling one of said output terminals with said output circuit means to add one phase of the wave from said wave generating means to the wave from said balanced modulator.

References Cited by the Examiner

UNITED STATES PATENTS

| | | | |
|---|---|---|---|
| 3,120,580 | 2/64 | Parker | 179—15 |
| 3,122,610 | 2/64 | Csicsatka | 179—15 |

OTHER REFERENCES

Rider; Encyclopedia on Cathode-Ray Oscilloscopes and Their Uses, pp. 448–450.

General Electric, FM Stereo Radio Service Manual, Model T1000B, October 1961, pp. 1–13.

Recklinghauson: Journal of the Audio Engineering Society, January 1962, pp. 31–35.

Feldman: "Signal Generators for FM Multiplex," Electronic World, June 1962, pp. 73–77.

Lianz: "How To Align Multiplex Adapters," Audio, June 1962, pp. 18–22 and 55–56.

DAVID A. REDINBAUGH, *Primary Examiner.*